US007131908B2

(12) United States Patent
Baerlocher

(10) Patent No.: US 7,131,908 B2
(45) **Date of Patent: *Nov. 7, 2006**

(54) GAMING DEVICE HAVING A WEIGHTED PROBABILITY FOR SELECTING A BONUS GAME

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 265 days.

This patent is subject to a terminal disclaimer.

(21) Appl. No.: 10/414,638

(22) Filed: Apr. 14, 2003

(65) Prior Publication Data

US 2003/0176220 A1 Sep. 18, 2003

Related U.S. Application Data

(63) Continuation of application No. 09/680,346, filed on Oct. 5, 2000, now Pat. No. 6,565,436.

(51) Int. Cl.
*A63F 13/00* (2006.01)

(52) U.S. Cl. ............................ 463/20; 463/16; 463/21

(58) Field of Classification Search ............ 463/16–22, 463/25–28, 31; 273/143 R, 138.1, FOR. 138 A, 273/FOR. 143 R See application file for complete search history.

(56) References Cited

U.S. PATENT DOCUMENTS 4,624,459 A 11/1986 Kaufman
4,695,053 A 9/1987 Vazquez, Jr. et al.
4,710,873 A * 12/1987 Breslow et al. ............... 463/31
4,991,848 A 2/1991 Greenwood et al.
5,456,465 A 10/1995 Durham
5,524,888 A 6/1996 Heidel
5,711,525 A 1/1998 Breeding
5,788,230 A 8/1998 Krise et al.
5,848,932 A * 12/1998 Adams ........................ 463/20
5,873,781 A 2/1999 Keane
5,947,821 A * 9/1999 Stone .......................... 463/13

(Continued)

FOREIGN PATENT DOCUMENTS

DE 195 71 856 10/1996

(Continued)

OTHER PUBLICATIONS

Jazzy Jackpots Advertisements written by Atronic, published in 2000.

(Continued)

*Primary Examiner*—Xuan M. Thai
*Assistant Examiner*—Ross A. Williams
(74) *Attorney, Agent, or Firm*—Bell, Boyd & Lloyd, LLC

(57) ABSTRACT

The present invention provides a bonus scheme that has more than one and preferably at least three bonus games contained in one bonus scheme. Each bonus game provides excitement and enjoyment to the player via creative visual and audio displays. Each bonus game also has its own theme and may or may not be based upon schemes already known in the art of gaming devices. While the individual bonus games are not necessarily related to each other, the overall bonus scheme, preferably in the initial screen, ties the bonus games together in a master theme that provides flexibility for the individual bonus games to have their own themes. The preferred embodiment of the present invention automatically activates the bonus scheme upon a bonus triggering event. The game selects for the player one of three bonus games contained in the bonus scheme. The player plays the selected game and receives an award and the game returns the player to the base game.

70 Claims, 6 Drawing Sheets

U.S. PATENT DOCUMENTS

| | | | | |
|---|---|---|---|---|
| 5,984,781 | A | 11/1999 | Sunaga | |
| 6,047,963 | A * | 4/2000 | Pierce et al. | 273/121 B |
| 6,059,289 | A | 5/2000 | Vancura | |
| 6,062,980 | A | 5/2000 | Luciano | |
| 6,102,400 | A | 8/2000 | Scott et al. | |
| 6,126,542 | A | 10/2000 | Fier | |
| 6,142,874 | A | 11/2000 | Noduchi et al. | |
| 6,146,273 | A * | 11/2000 | Olsen | 463/27 |
| 6,149,157 | A | 11/2000 | Saun | |
| 6,159,097 | A * | 12/2000 | Gura | 463/20 |
| 6,159,098 | A | 12/2000 | Slomiony et al. | |
| 6,179,710 | B1 * | 1/2001 | Sawyer et al. | 463/16 |
| 6,203,429 | B1 | 3/2001 | Demar et al. | |
| 6,210,275 | B1 | 4/2001 | Olsen | |
| 6,290,600 | B1 * | 9/2001 | Glasson | 463/20 |
| 6,302,790 | B1 * | 10/2001 | Brossard | 463/20 |
| 6,309,300 | B1 | 10/2001 | Glavich | |
| 6,315,664 | B1 * | 11/2001 | Baerlocher et al. | 463/21 |
| 6,328,649 | B1 * | 12/2001 | Randall et al. | 463/20 |
| 6,558,255 | B1 * | 5/2003 | Walker et al. | 463/25 |
| 6,569,016 | B1 * | 5/2003 | Baerlocher | 463/16 |
| 6,645,071 | B1 * | 11/2003 | Perrie et al. | 463/16 |
| 6,648,759 | B1 * | 11/2003 | Vancura | 463/20 |
| 6,712,693 | B1 * | 3/2004 | Hettinger | 463/20 |
| 2002/0010018 | A1 | 1/2002 | Lemay et al. | |
| 2002/0039918 | A1 | 4/2002 | Anderson et al. | |

FOREIGN PATENT DOCUMENTS

| | | |
|---|---|---|
| GB | 2 084 371 | 9/1980 |
| GB | 2 066 991 | 7/1981 |
| GB | 2 105 891 | 3/1983 |
| WO | WO 00/12186 | 3/2000 |
| WO | WO 00/32286 | 6/2000 |

OTHER PUBLICATIONS

Jazzy Jackpots Article published by Strictly Slots in Mar. 2001.
South Park Brochure published by IGT in 2000.

* cited by examiner

GAMING DEVICE HAVING A WEIGHTED PROBABILITY FOR SELECTING A BONUS GAME

PRIORITY CLAIM

This application is a continuation of and claims the benefit of U.S. patent application Ser. No. 09/680,346 filed Oct. 5, 2000 now Pat. No. 5,565,436.

CROSS-REFERENCE TO RELATED APPLICATIONS

This application is related to the following commonly-owned co-pending patent applications: "GAMING DEVICE HAVING AN INDICATOR SELECTION WITH PROBABILITY-BASED OUTCOME BONUS SCHEME," Ser. No. 09/605,809, now U.S. Pat. No. 6,315,664 B1; "GAMING DEVICE HAVING A MULTI-ROUND BONUS SCHEME WHEREIN EACH ROUND HAS A PROBABILITY OF SUCCESS," Ser. No. 09/688,441, and "GAMING DEVICE HAVING RELATED MULTI-GAME BONUS SCHEME," Ser. No. 09/688,972.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a bonus scheme, wherein the bonus scheme contains more than one bonus games, and the bonus scheme randomly selects one of the bonus games based upon a weighted probability of selecting the bonus game.

BACKGROUND OF THE INVENTION

Gaming machines currently exist with bonus schemes in which a player has one or more opportunities to obtain bonus awards or credits. Typically, gaming machines employ a single bonus game such that whenever the bonus round begins, the gaming device displays the same bonus game. While playing these bonus games may last for a relatively short or long time and may provide small or large bonus awards, the variety provided by the bonus scheme is limited. Over time, player excitement and enjoyment begin to erode in part because the player may play the same bonus game several times. Therefore, it is desirable to have more than one bonus game contained in a bonus scheme of a gaming device to provide players with a variety of bonus games, displays and outcomes.

Known gaming machines include schemes that have a plurality of different games from which the player chooses a game to play. After playing each of the games, the player likely becomes accustomed to the games, prefers one or more of the games over the others, and selects to play only the preferred games whenever a bonus triggering event occurs. The player's control over the game selection and the preference of one or more games over the others negate the variety of having multiple games. Consequently, when the player tires of the preferred games, the player will in many cases discontinue playing the gaming machine altogether.

To increase player enjoyment and excitement, it is desirable to provide players with new bonus schemes in which the players have multiple opportunities to play different bonus games. In particular, as provided by the present invention, a gaming machine that randomly selects a bonus game for the player from a number games that have different features, payouts, and difficulty levels provides the player with a variety that increases and maintains player enjoyment and excitement.

SUMMARY OF THE INVENTION

The present invention provides a bonus scheme that has more than one and preferably at least three bonus games contained in one bonus scheme. Each bonus game provides excitement and enjoyment to the player via creative visual and audio displays. Each bonus game also has its own theme and may or may not be based upon schemes already known in the art of gaming devices. While the individual bonus games are not necessarily related to each other, the overall bonus scheme, preferably in the initial screen, ties the bonus games together in a master theme that provides flexibility for the individual bonus games to have their own themes.

In the preferred embodiment of the present invention, when the player receives a designated symbol during the base game operation of the gaming device, the gaming device automatically activates the bonus scheme. The bonus scheme provides a start bonus button, which enables the player to begin the bonus round. When the player presses the start bonus button, the gaming device selects for the player one of the three bonus games contained in the bonus scheme. The player plays the selected bonus game and receives a bonus award or credit and returns the player to the base game.

For example, one embodiment of the present invention displays an initial screen on the video monitor of the gaming device, which contains a road, presumably leading to a place with gaming establishments, that has three billboards. Each billboard represents, describes the nature of, and discloses the maximum possible payout for each of the bonus games contained in the bonus scheme. The billboard master theme enables the scheme to employ games having individual and unrelated themes. This embodiment provides one bonus game that involves a gaming machine, one that involves building a hamburger, and one that involves a dancing character. The bonus round triggering mechanism of this embodiment is the appearance of a designated symbol on any one of the reels of the gaming device.

The gaming machine selects the bonus game randomly based upon predetermined probabilities that the implementor programs into the memory device of the computer of the gaming machine. The probability distribution may be any distribution that suits the above described themes and that maximizes player enjoyment and excitement. The probabilities could be "flat" for example a 1 in 3 probability across the board for each of the three individual bonus games. Preferably, the distribution excites the player by providing one or more desirable games that have a lower probability of selection. A game may be desirable by having a large maximum potential payout or by paying out a relatively large bonus in a relatively large number of instances.

It is therefore an object of the present invention to provide a gaming device with a bonus scheme which provides more than one bonus game, wherein the player randomly receives one of the games based upon a weighted probability of selecting the bonus game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
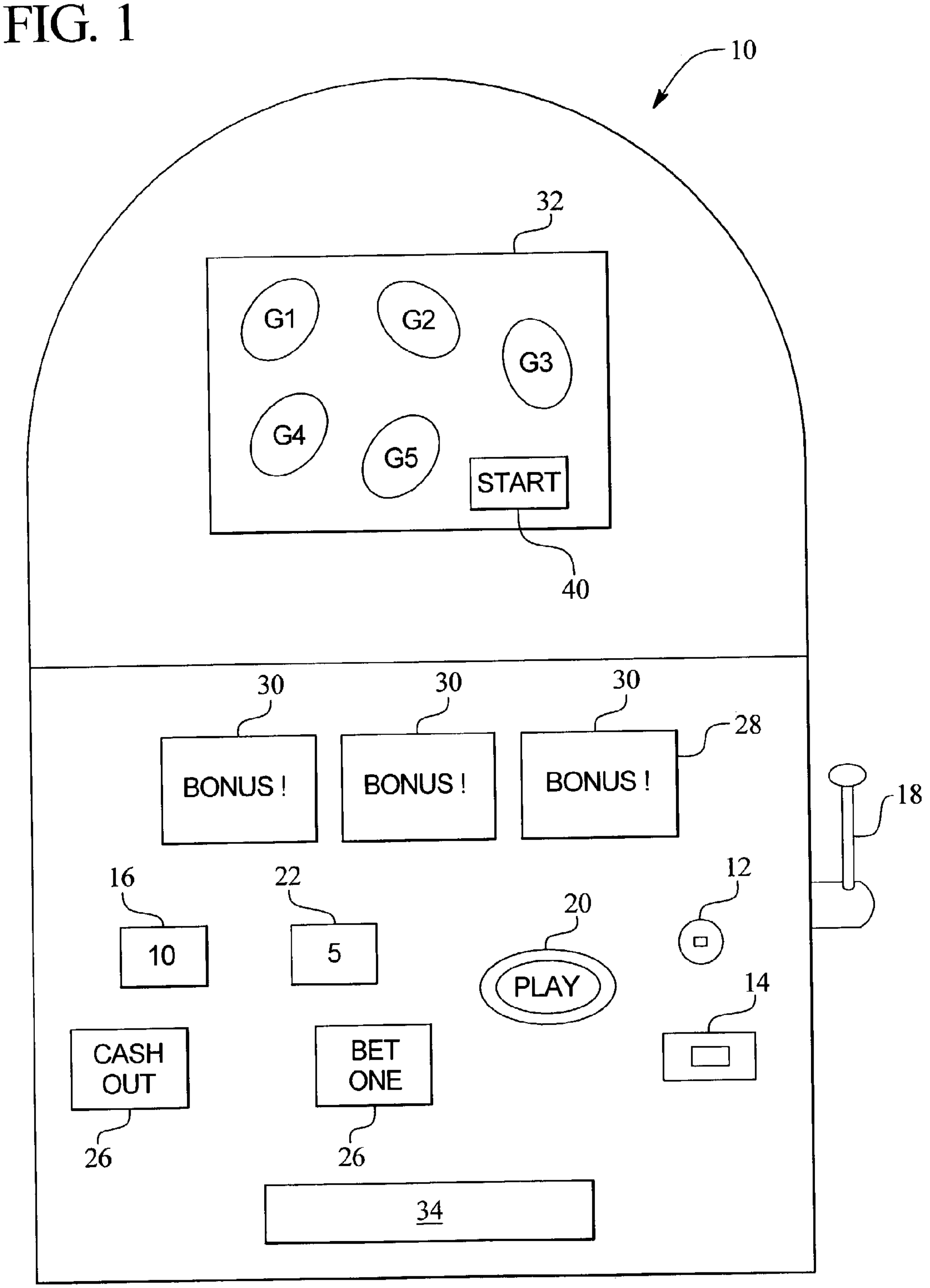
FIG. 1 is a front plan view of the gaming device of the present invention generally showing the bonus scheme of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism which starts the game.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at video monitor 32 instead of at display window 28.

At any time during the game, a player may "cash out" and thereby receive a number of coins corresponding to the number of remaining credits by pushing a cash out button 26. When the player "cashes out," the player receives the coins in a coin payout tray 34. The gaming device 10 may employ other payout mechanisms such as credit slips redeemable by a cashier or electronically recordable cards which keep track of the player's credits.

Figure 2:
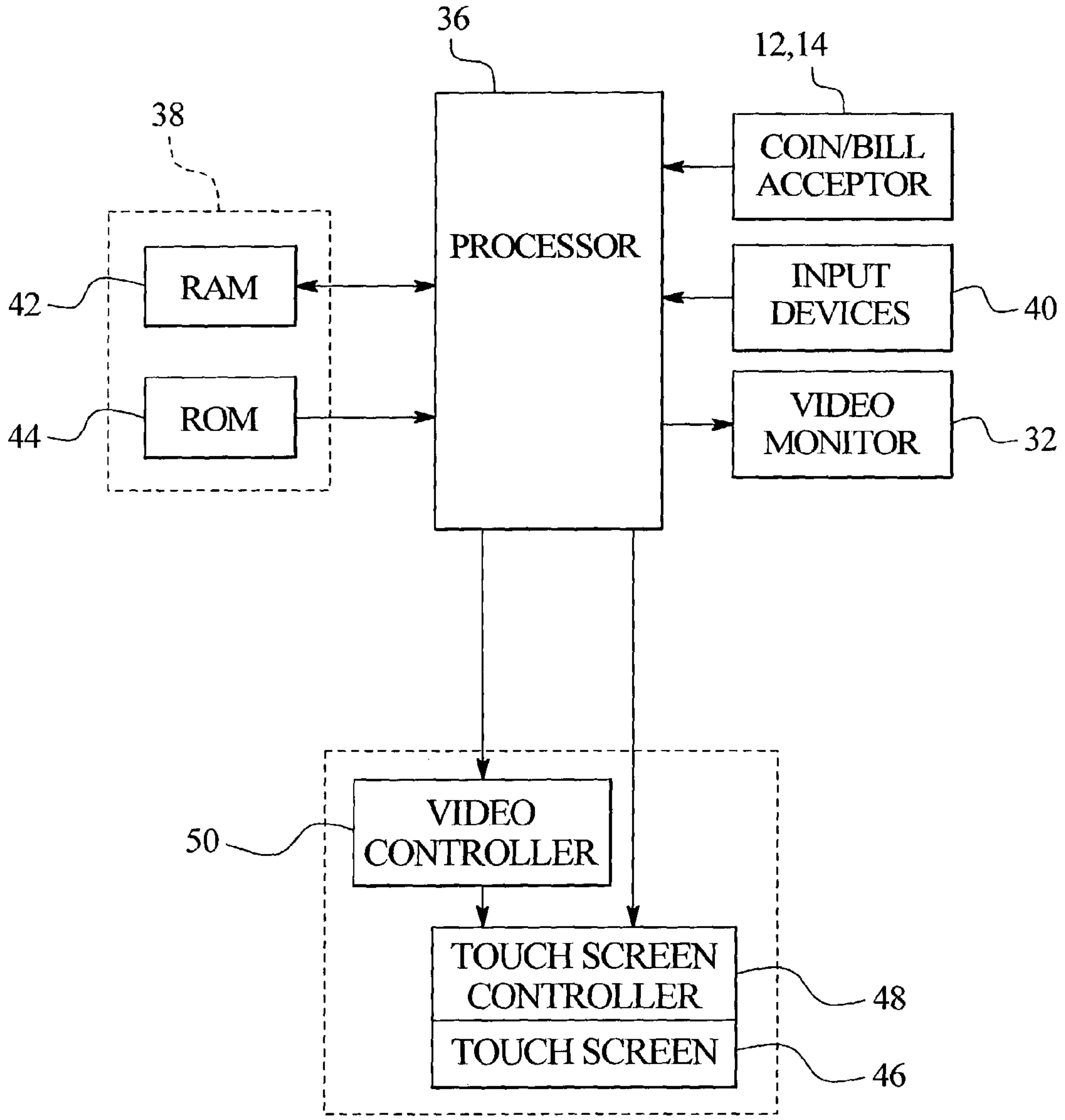
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 36, a memory device 38 for storing program code or other data, a video monitor 32 or other display device (i.e., a liquid crystal display) and at least one input device as indicated by block 40 such as the arm 18, play button 20, the bet one button 24, and the cash out button 26. The processor 36 is preferably a microprocessor or microcontroller-based platform which is capable of displaying images, symbols and other indicia such as images of people, characters, places, things and faces of cards. The memory device 38 can include random access memory (RAM) 42 for storing event data or other data generated or used during a particular game. The memory device 38 can also include read only memory (ROM) 44 for storing program code which controls the gaming device 10 so that it plays a particular game in accordance with applicable game rules and pay tables.

As illustrated in FIG. 2, the player can use input devices as generally indicated by block 40 to input signals into gaming device 10. However, it is preferable that a touch screen 46 and an associated touch screen controller 48 are used instead of the conventional video monitor 32. Touch screen 46 and touch screen controller 48 are connected to a video controller 50 and processor 36. A player can make decisions and input signals into the gaming device 10 by touching touch screen 46 at the appropriate places. As further illustrated in FIG. 2, the processor 36 can be connected to coin slot 12 or bill acceptor 14. The processor 36 can be programmed to require a player to deposit a certain amount of money in order to start the game.

It should be appreciated that although a processor 36 and memory device 38 are preferable implementations of the present invention, the present invention can also be implemented using one or more application-specific integrated circuits (ASIC's) or other hardwired devices, or using mechanical devices (collectively referred to herein as a "processor"). Furthermore, although the processor 36 and memory device 38 preferably reside on each gaming device 10 unit, it is possible to provide some or all of their functions at a central location such as a network server for communication to a playing station such as over a local area network (LAN), wide area network (WAN), Internet connection, microwave link, and the like. The processor 36 and memory device 38 are together generally referred to herein as a "computer" or the "controller."

With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, gaming device 10 also preferably gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device 10 also includes a display device such as a video monitor 32 shown in FIG. 1. The display device visually displays images and produces sounds, enabling the player to play the bonus round. Preferably, the qualifying condition is a predetermined combination of indicia appearing on a plurality of reels 30. As illustrated in the three reel slot machine shown in FIG. 1, the qualifying condition could be the text "BONUS!" appearing in the same location on three adjacent reels.

Bonus Scheme

FIG. 1 generally shows the bonus scheme of the present invention. The bonus scheme employs the reels 30 of display window 28. Upon obtaining the qualifying condition, such as "BONUS!" appearing in the same location on three adjacent reels, the player begins the bonus round employing the bonus scheme as shown generally in the video monitor 32. The bonus scheme preferably initially displays, in one screen and at the same time, each of a plurality of bonus games that the bonus scheme could select for the player to play. FIG. 1 also shows a general input device 40 (FIG. 2) that the player will select to start the bonus round after the gaming device 10 displays the initial bonus scheme screen in the video monitor 32.

FIG. 1 shows five games, G1 through G5, although the present invention contemplates having any number of games to increase player enjoyment and excitement. Showing the player a preview of the subject matter of the possible bonus games raises expectations and increases player enjoyment and excitement. To aid in the description of the invention, the remaining objects, features and advantages of the present invention will be discussed in conjunction with one embodiment having three bonus games. It should be appreciated the present invention can employ these objects, features and advantages with any number and type of bonus games.

Figure 3:
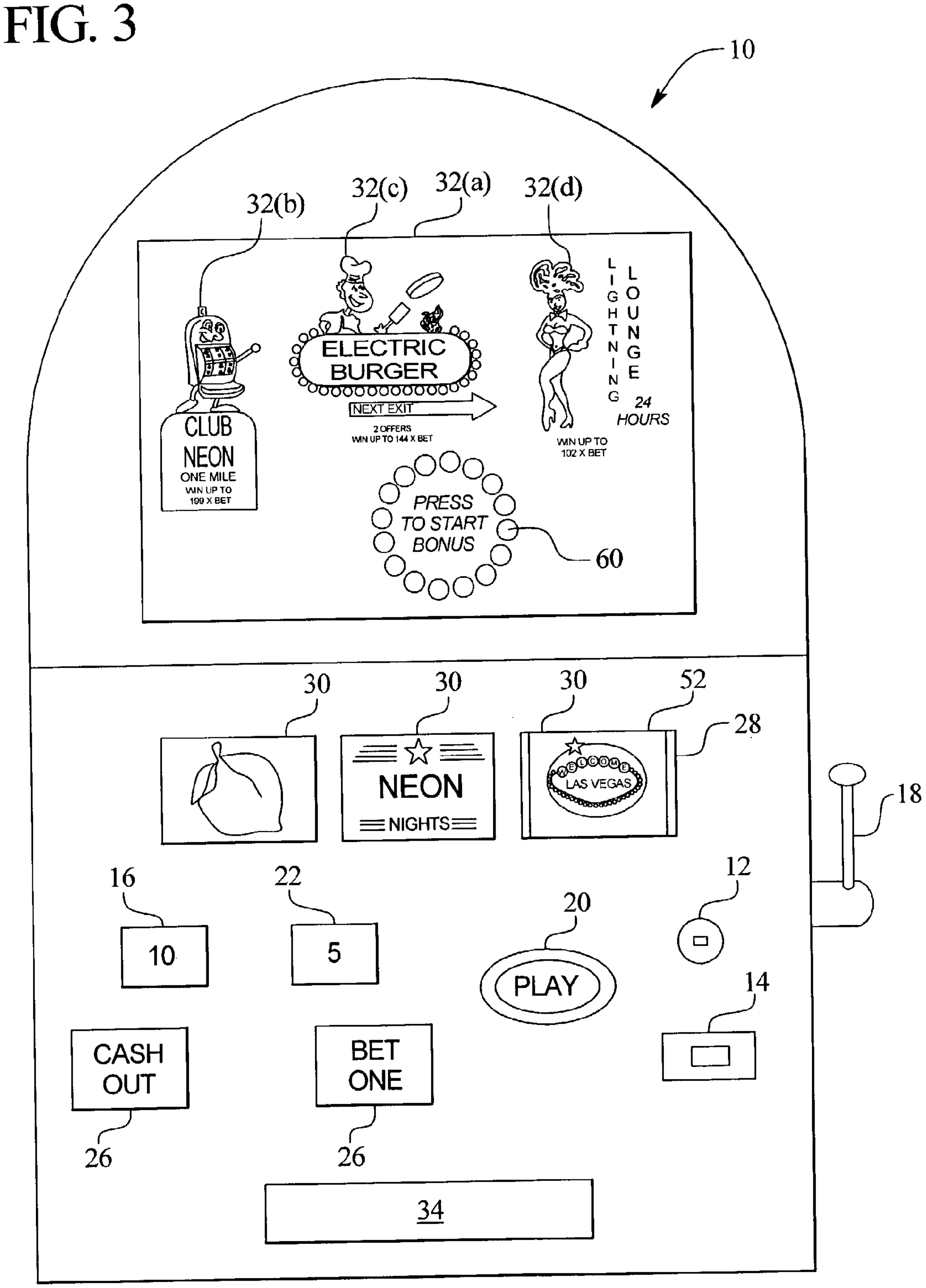
FIG. 3 is a front plan view of the gaming device of the present invention showing the initial screen of one embodiment of the bonus scheme of the present invention and the triggering base-game symbol.

FIG. 3 shows one embodiment of the present invention. If a player achieves a bonus triggering or qualifying condition while playing the game, the gaming device 10 automatically begins the bonus round of the present invention. In this embodiment, the bonus triggering or qualifying condition is a designated symbol such as a Las Vegas symbol 52 on one of the reels as shown in FIG. 3. It should be appreciated that the present invention could employ any symbol or combination of symbols.

To enhance player excitement and enjoyment, when the designated symbol 52 appears, the game preferably provides a bonus scheme initialization with suitable audio and visual signals to inform the player that a symbol or a combination of the reels 28 has invoked the bonus scheme. For example, the game could maintain a blank video monitor 32 until the bonus scheme begins, wherein the monitor flashes suitable video signals before presenting an initial bonus scheme screen 32(*a*) in video monitor 32.

The initial bonus screen 32(*a*) preferably has a theme. Using the theme, the bonus scheme preferably presents a player with a plurality of possible bonus games. The present invention contemplates displaying any number of games and any type of game. The games may be well known or have novel elements. In the preferred embodiment, the initial bonus scheme screen 32(*a*) shows a road and a plurality of billboards or signs. Each billboard or sign represents a separate bonus game, i.e.: (i) the slot coin bonus game 32(*b*); (ii) the burger flip bonus game 32(*c*); and (iii) the dancing character bonus game 32(*d*).

The bonus games can have any configuration, difficulty level, winning probabilities, and level of player interaction. The bonus games can be as simple as having the player press a single button. Alternatively, the bonus games could have multiple levels and/or multiple opportunities to win. The games can employ well known game sequences such as the pick-until routine. The games can also provide the player with a plurality of additional chances if the player does not fare well in the bonus game.

The plurality of bonus games, taken together, preferably provides a player with a range of potential winnings and also with a range in the difficulty of obtaining high payouts. From the point of view of the player, there preferably is at least one more and at least one less desirable bonus game within the group. For instance, as shown in the initial bonus scheme screen 32(*a*) of FIG. 3, the slot coin bonus game 32(*b*) enables the player to win up to 199 times the player's bet, the burger flip bonus game 32(*c*) enables the player to win up to 144 times the player's bet, and the dancing character bonus game 32(*d*) enables the player to win up to 182 times the player's bet.

The games can also vary the difficulty of obtaining high payouts, for example, the burger flip bonus game 32(*c*) preferably enables the player one opportunity to discard an initial burger and play for a second burger. It should be appreciated that the present invention contemplates providing any range of winnings and range of difficulty in accordance with a game theme and to increase player enjoyment and excitement.

The present invention assigns a probability to each displayed bonus game. When the bonus scheme is invoked, the processor 36 of the computer uses the game probabilities to select a particular bonus game from the total number of games. Preferably, the probabilities of the separate games add up to 100%. For example, the probability distribution of one embodiment could be: (i) 25% for the slot coin bonus game 32(*b*); (ii) 40% for the burger flip bonus game 32(*c*); and (iii) 35% for the dancing character bonus game 32(*d*). In this example, the game having the highest potential payout (32(*b*)) appears in the smallest percentage of bonus rounds (25%), and the game having the smallest potential payout (32(*c*)) appears in the largest percentage of bonus rounds (40%).

The implementor uses the probability distribution to create a character for the bonus scheme, wherein the scheme preferably either pays often or has high payouts. In the above example, the distribution is fairly equal among the games, but provides the highest percentage for the burger flip bonus game 32(*c*), which has lower payouts but gives the player a second chance. This distribution creates a bonus scheme that tends to pay well more often (i.e. pays above a 50% of max) rather than paying the maximum payouts.

The plurality of bonus games increases excitement and enjoyment by providing the player with a variety of bonus games within one gaming device 10. The bonus scheme provides an incentive to the player to play the gaming device 10 until the player views and plays each bonus game. For this reason, the implementor may decide to create a particular bonus game that has a particularly large payout or that pays well (i.e. above 50% of the game's maximum payout) a particularly high number of times and that has a small chance of being selected, for example 10%.

Bonus Scheme Sequence

Referring to FIG. 3, when a player achieves a bonus triggering or qualifying condition while playing the game, such as when the reels 30 of the display window 28 show the Las Vegas symbol 52 on one of the reels. The gaming device 10 automatically begins the bonus scheme of the present invention, preferably provides a bonus scheme initialization to enhance player excitement and enjoyment, and presents the initial bonus scheme screen 32(*a*) in video monitor 32, which preferably includes a start bonus button 60. Alternatively, the start button may be electromechanical and connected to the processor 36 as an input device 40.

Figure 4:
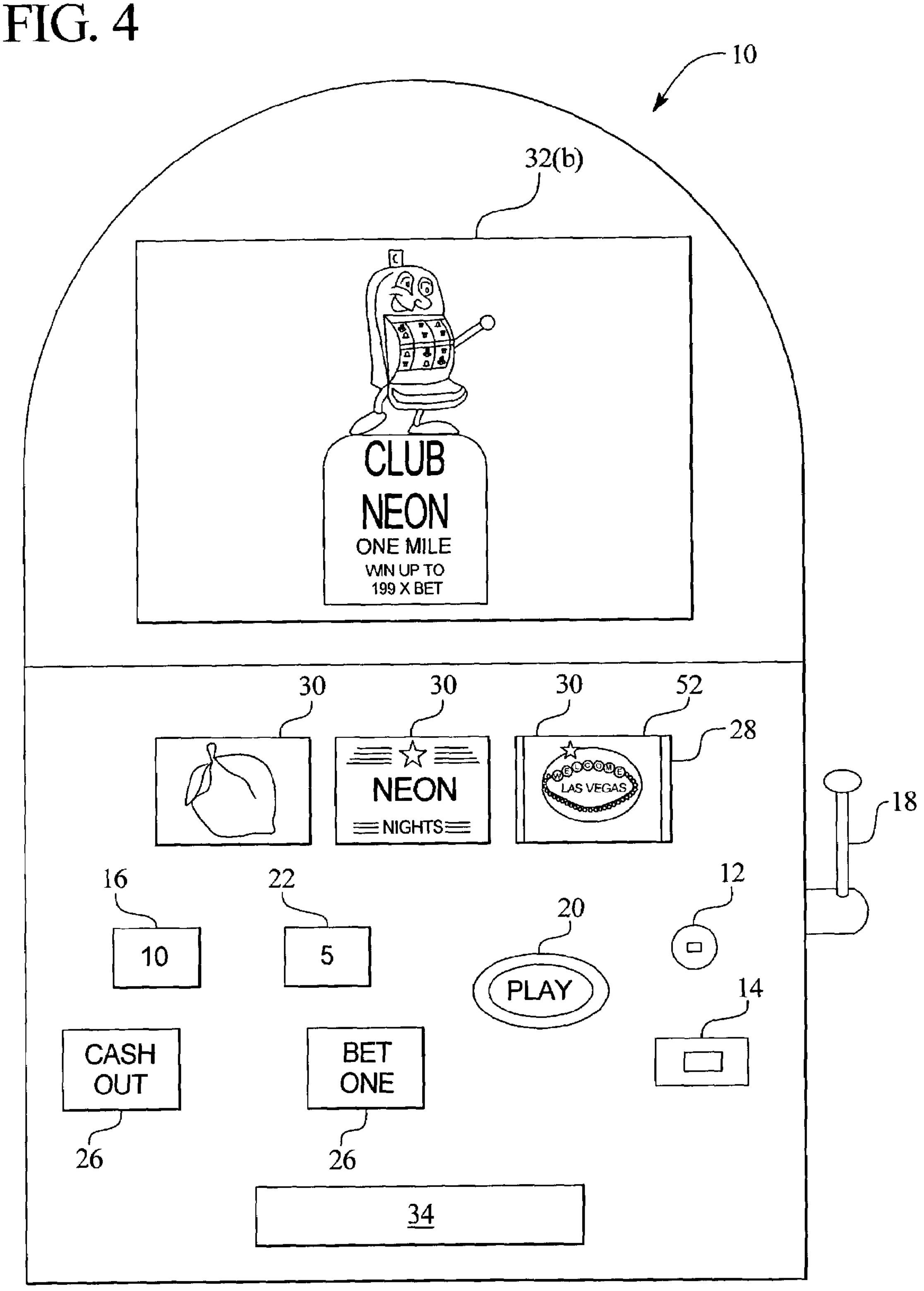
FIG. 4 is a front plan view of the gaming device of the present invention showing a first bonus game of one embodiment of the present invention.
Figure 5:
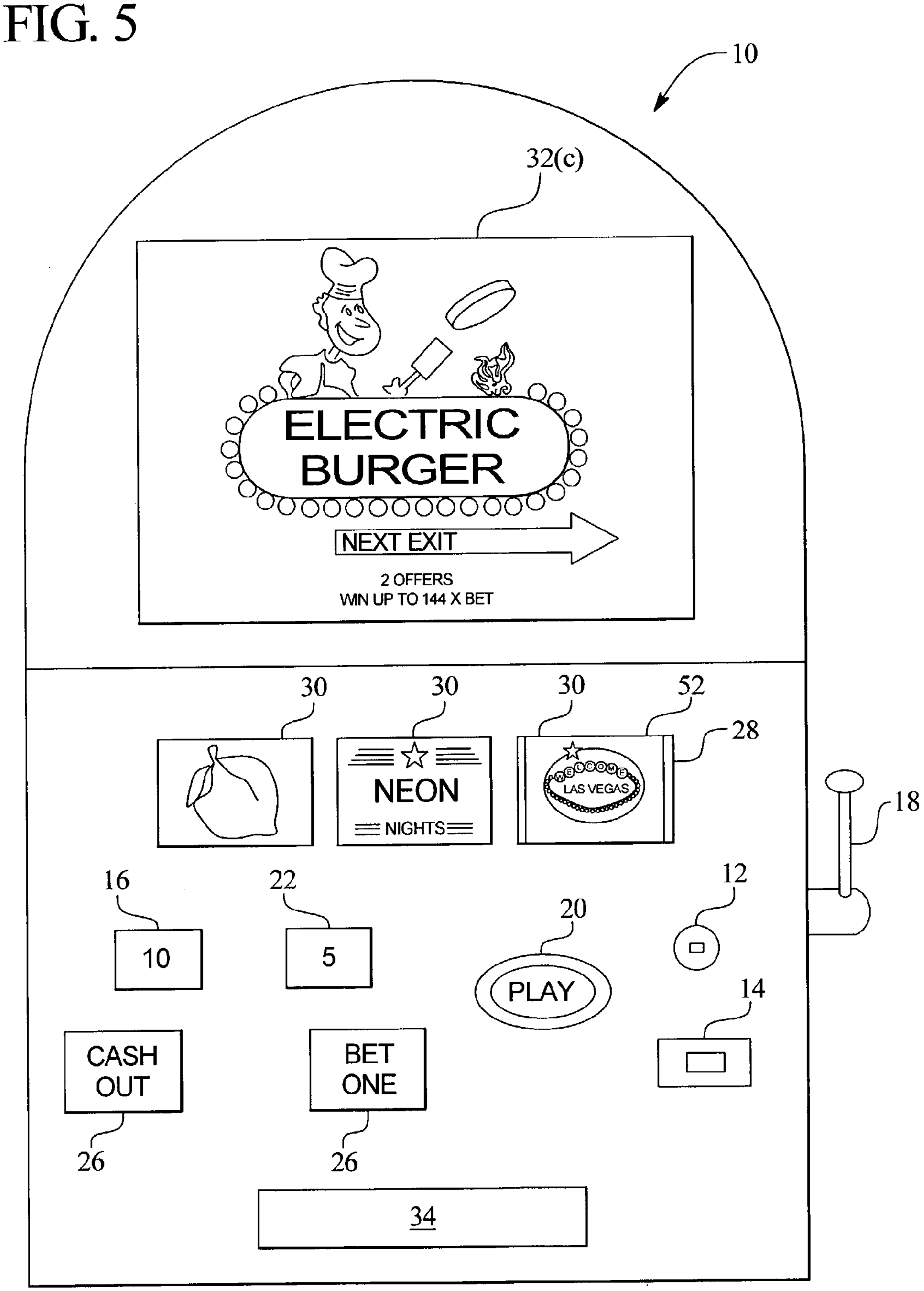
FIG. 5 is a front plan view of the gaming device of the present invention showing a second bonus game of one embodiment of the present invention.
Figure 6:
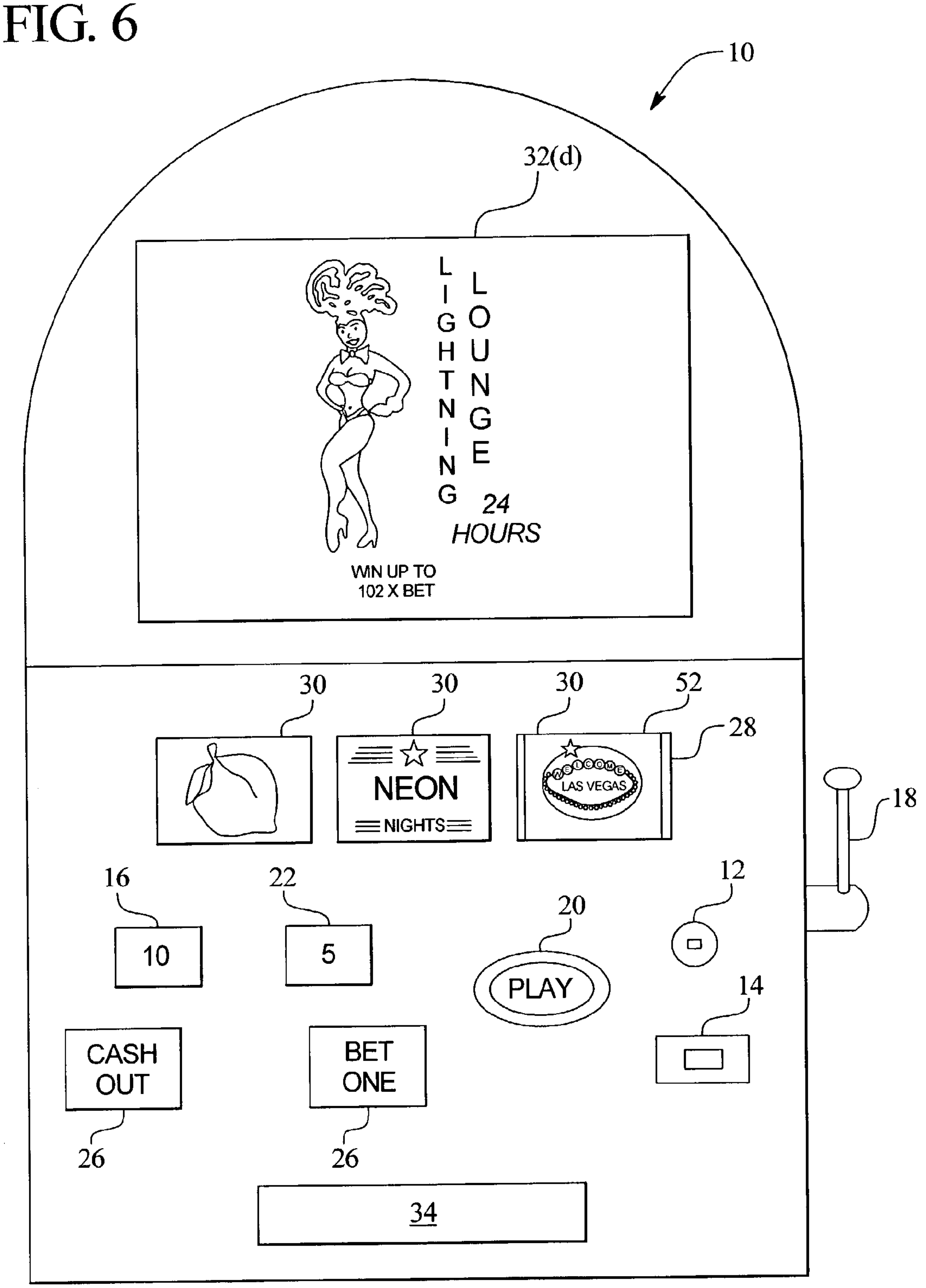
FIG. 6 is a front plan view of the gaming device of the present invention showing a third bonus game of one embodiment of the present invention.

When the player pushes the start bonus button 60, the processor 36 selects one of the bonus games using a set of probabilities for each game stored in the memory device 38 from the group of 32(*b*), 32(*c*), or 32(*d*) and displays the appropriate game screen to the player as shown respectively in FIGS. 4, 5, and 6. The player plays the selected game, and the gaming device 10 adds the payout to the player's credit display 16 and returns the player to the base game.

In one example, the player plays the base game of gaming device 10 until one of the reels shows the Las Vegas symbol. The game displays the initial bonus scheme screen 32(*a*), and the player presses the start bonus button 60. The game randomly selects and displays the burger flip bonus game 32(*c*) (FIG. 5), which has a 2 in 5 or 40% chance of being selected. The player plays the burger flip game and receives a multiplier bonus of 70 times the player's bet which is 5 credits as shown in the credit display 22. The game adds 350 base game credits (not illustrated) to the player's credit display 16 and returns the player to the base game.

The bonus scheme of the present invention contemplates awarding a higher payout when the player bets more bonus awards (bet display 22 of FIGS. 1, 3, 4, 5 and 6 shows the player's bet). In this embodiment, the memory device 38 stores a set of factors that correspond to the amount bet. For instance, the memory device could store a 1.0 factor for a bet between 1 credit and 5 credits, a 1.25 factor for a bet between 6 credits and 10 credits, and a 1.5 factor for over 10 credits. In the above example, if the player bet 6 credits and received the same bonus game outcome, the game would reward the player 70× the player's bet (6)×1.25 or 525 credits. If the player bet 11 credits, the game would reward the player 70×11×1.5 or 1155 credits.

The bonus scheme of the present invention also contemplates enabling the player to have a second chance or a plurality of second chances when the bonus payout is below a predetermined level. The predetermined level is stored in memory device 38. In the above example, if the predetermined level is a 10× multiplier and the player plays the burger flip bonus game 32(*c*) and only obtains a 5× multiplier, the bonus scheme could automatically reset the bonus round or give the player the option of trying again. The bonus scheme contemplates enabling the player to have a second chance any time the player scores below the threshold or, alternatively, for only a predetermined number of consecutive times. The bonus scheme also contemplates setting any award or multiplier number as the threshold.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:

a base game operable upon a wager by a player;

a plurality of bonus games, wherein at least two of said bonus games are different;

a probability associated with each of said bonus games;

at least one image associated with each of said bonus games;

a display device; and a processor operable with said display device to display the images associated with at least two of said bonus games after the occurrence of a triggering event including an occurrence of a predetermined symbol or combination of symbols in a play of the base game, to select one of said bonus games based on the probabilities, to display the image associated with the selected bonus game and to provide the selected bonus game to the player.

2. The gaming device of claim 1, wherein the processor is operable with said display device to select one of said bonus games based on the probabilities after displaying the images associated with at least two of said bonus games.

3. The gaming device of claim 1, wherein the processor is operable with said display device to select one of said bonus games based on the probabilities after displaying the images associated with each of said plurality of bonus games.

4. The gaming device of claim 1, wherein the processor is operable with said display device to select one of said bonus games based on the probabilities prior to displaying the images associated with at least two of said bonus games.

5. The gaming device of claim 1, wherein the processor is operable with said display device to select one of said bonus games based on the probabilities prior to displaying the images associated with each of said plurality of bonus games.

6. The gaming device of claim 1, wherein the processor is operable with said display device to display the image associated with each of said plurality of bonus games after the occurrence of said triggering event.

7. The gaming device of claim 1, wherein the processor is operable with said display device to display the image associated with each of said plurality of bonus games prior to the occurrence of said triggering event.

8. The gaming device of claim 1, wherein said processor is operable with said display device to display a graphic representation of the selection of one of said bonus games.

9. The gaming device of claim 8, wherein said graphic representation includes displaying, one at a time, a plurality of said images.

10. The gaming device of claim 8, wherein said graphic representation includes displaying, one at a time, each of said images.

11. The gaming device of claim 1, wherein at least two of said probabilities are different.

12. The gaming device of claim 1, wherein each of said probabilities are different.

13. The gaming device of claim 1, wherein each of said bonus games are different.

14. The gaming device of claim 1, wherein the processor is operable to enable the player to initiate the selection of one of said bonus games.

15. The gaming device of claim 1, wherein each bonus game provides a different bonus award.

16. The gaming device of claim 1, wherein each bonus game is associated with a different range of bonus awards.

17. The gaming device of claim 1, wherein each bonus game is associated with a different range of outcomes.

18. The gaming device of claim 1, wherein each bonus game has a different maximum payout award.

19. The gaming device of claim 18, wherein the higher the maximum payout award of one of said bonus games, the lower the probability associated with said bonus game.

20. The gaming device of claim 18, wherein the higher the maximum payout award of one of said bonus games, the higher the probability associated with said bonus game.

21. A gaming device comprising:

a base game operable upon a wager by a player;

a plurality of bonus games, wherein at least two of said bonus games are different;

a probability associated with each of said bonus games;

at least one image associated with each of said bonus games; and a triggering event including an occurrence of a predetermined symbol or combination of symbols in a play of the base game, wherein after the occurrence of said triggering event, the images associated with at least two of said bonus games are displayed, a selection of one of said bonus games occurs based on the probabilities associated with the bonus games, and wherein the image associated with the selected bonus game is displayed and the selected bonus game is provided to the player.

22. The gaming device of claim 21, wherein prior to the occurrence of said triggering event the image associated with at least two of said plurality of bonus games are displayed.

23. The gaming device of claim 21, wherein prior to the occurrence of said triggering event the image associated with each of said bonus games is displayed.

24. The gaming device of claim 21, wherein the selection of one of said bonus games occurs after the displaying of said different images.

25. The gaming device of claim 21, wherein the selection of one of said bonus games is displayed to the player.

26. The gaming device of claim 21, wherein at least two of said probabilities are different.

27. The gaming device of claim 21, wherein each of said probabilities are different.

28. The gaming device of claim 21, wherein each of said bonus games are different.

29. A gaming device comprising:

at least two different bonus games;

a probability associated with each of said different bonus games;

a different image associated with each of said different bonus games;

a display device; and a processor operable with said display device to display the different images associated with said different bonus games after the occurrence of a triggering event including an occurrence of a predetermined symbol or combination of symbols, to select one of said different bonus games based on the probabilities, to display the image associated with the selected bonus game and to provide the selected bonus game to a player.

30. The gaming device of claim 29, wherein the processor is operable with said display device to select one of said bonus games based on the probabilities after displaying the images associated with said different bonus games.

31. The gaming device of claim 29, wherein the processor is operable with said display device to select one of said bonus games based on the probabilities prior to displaying the images associated with said different bonus games.

32. The gaming device of claim 29, wherein at least two of said probabilities are different.

33. The gaming device of claim 29, wherein each of said probabilities are different.

34. A gaming device comprising:

a primary game operable upon a wager by a player;

at least two different bonus games;

a probability associated with each of said different bonus games;

a different image associated with each of said different bonus games; and a triggering event including an occurrence of a predetermined symbol or combination of symbols in a play of the primary game, wherein after the occurrence of said triggering event, the different images associated with said different bonus games are displayed, a selection of one of said different bonus games occurs based on the probabilities associated with the different bonus games, the image associated with the selected bonus game is displayed and the selected bonus game is provided to the player.

35. The gaming device of claim 34, wherein prior to the occurrence of said triggering event the image associated with each of said bonus games is displayed.

36. The gaming device of claim 34, wherein the selection of one of said different bonus games occurs after the displaying of said different images.

37. The gaming device of claim 34, wherein the selection of one of said bonus games is displayed to the player.

38. The gaming device of claim 34, wherein at least two of said probabilities are different.

39. The gaming device of claim 34, wherein each of said probabilities are different.

40. A gaming device comprising:

a primary game operable upon a wager by a player;

a plurality of different secondary games;

a probability associated with each of said different secondary games;

a secondary game initiation device operable by the player;

a display device; and a processor operable with said display device and said secondary game initiation device, after the occurrence of a triggering event including an occurrence of a predetermined symbol or combination of symbols in a play of the primary game to enable the player to initiate the selection of one of said secondary games using the secondary game initiation device which causes the processor to select one of said secondary games based on the probabilities associated with said secondary games and to provide the selected secondary game to the player.

41. The gaming device of claim 40, wherein the probabilities associated with at least two secondary games are different.

42. The gaming device of claim 40, wherein the probability associated with each secondary game is different.

43. A gaming device comprising:

a primary game operable upon a wager by a player;

a plurality of secondary games, wherein at least two of said secondary games are different, and wherein each of said secondary games has a probability of being selected;

a display device; and a processor operable with the display device to randomly select based on said probabilities one of said secondary games after the occurrence of a triggering event including an occurrence of a predetermined symbol or combination of symbols in play of the primary game and to provide the selected secondary game to the player.

44. The gaming device of claim 43, wherein each of said secondary games are different.

45. A gaming device comprising:

a primary game operable upon a wager by a player;

a plurality of different secondary games, wherein each of said secondary games has a probability of being selected; and a triggering event including an occurrence of a predetermined symbol or combination of symbols in a play of the primary game, wherein after the occurrence of said triggering event in the primary game, one of the different secondary games is randomly selected based on said probabilities and said selected secondary game is provided to the player.

46. A gaming device comprising:

a first game operable upon a wager by a player;

a plurality of second games, wherein at least two of said second games are different;

a probability associated with each second game; and a triggering event in said first game, wherein after the occurrence of the triggering event in the first game a random selection of one of said second games based on the probabilities occurs, said selected second game is provided to the player wherein the selected second game awards the player a second game award and if the second game award has a value less than a predetermined value, another random selection of one of said second games based on the probabilities occurs and said selected game is provided to the player.

47. The gaming device of claim 46, wherein the probabilities associated with at least two second games are different.

48. The gaming device of claim 46, wherein the probability associated with each second game is different.

49. A gaming device comprising:

a plurality of different bonus games, wherein each bonus game has a different range of possible payouts;

a different probability associated with each of said bonus games, wherein the probability associated with each bonus game is related to the associated range of payouts of said bonus game;

a display device; and a processor operable with said display device to select one of said bonus games based on the probabilities after the occurrence of a triggering event, wherein the triggering event includes an occurrence of a predetermined symbol or combination of symbols, to provide the selected bonus game to a player and to award the player a payout, if any, from the range of payouts associated with the selected bonus game.

50. The gaming device of claim 49, wherein the higher the range of payouts of one of said bonus games, the lower the probability associated with said bonus game.

51. The gaming device of claim 49, wherein the higher the range of payouts of one of said bonus games, the higher the probability associated with said bonus game.

52. A method for operating a gaming device, said method comprising the steps of:

(a) providing a primary game operable upon a wager by a player;

(b) providing a plurality of secondary games upon a triggering event including an occurrence of a predetermined symbol or combination of symbols in a play of the primary game, wherein at least two of the secondary games are different and a probability is associated with each secondary game;

(c) randomly selecting one of the secondary games based on the probabilities associated with the secondary games; and (d) providing the selected secondary game to the player.

53. The method of claim 52, wherein the steps are provided through a data network.

54. The method of claim 53, wherein the data network is an internet.

55. A method for operating a gaming device, said method comprising the steps of:

(a) providing a first game operable upon a wager by a player;

(b) providing a plurality of second games upon a triggering event including an occurrence of a predetermined symbol or combination of symbols in a play of the primary game, wherein each of the second games are different and a different probability is associated with each second game;

(c) randomly selecting one of the second games based on the probabilities associated with the second games; and (d) providing the selected second game to the player.

56. The method of claim 55, wherein the operation of the gaming device is provided through a data network.

57. The method of claim 56, wherein the data network is an internet.

58. A method for operating a gaming device, said method comprising the steps of:

(a) enabling a player to initiate a bonus round upon the occurrence of a triggering event including an occurrence of a predetermined symbol or combination of symbols, wherein the bonus round includes a plurality of different bonus games that are each associated with a probability;

(b) displaying an image associated with each of at least two of said bonus games;

(c) randomly selecting one of said bonus games based on said associated probabilities;

(d) displaying the image associated with said selected bonus game; and (e) providing the selected bonus game to the player.

59. The method of claim 58, wherein the probability associated with each bonus game is different.

60. The method of claim 58, wherein the image associated with each of said plurality of bonus games is displayed prior to the selection of one of said bonus games.

61. The method of claim 58, which includes the step of displaying a representation of the selection of one of said bonus games.

62. The method of claim 61, which includes enabling the player to initiate said representation.

63. The method of claim 58, wherein the bonus round is provided through a data network.

64. The method of claim 63, wherein the data network is an internet.

65. A method for operating a gaming device, said method comprising the steps of:

(a) triggering a bonus round upon a triggering event including a predetermined symbol or combination of symbols, wherein said bonus round includes a plurality of different secondary games;

(b) randomly selecting one of said secondary games based on probability data, wherein said secondary game is selected by a processor; and (c) providing the selected secondary game to a player.

66. The method of claim 65, wherein the bonus round is provided through a data network.

67. The method of claim 66, wherein the data network is an internet.

68. A method of operating a gaming device comprising the steps of:

(a) providing a primary game operable upon a wager by a player;

(b) providing a plurality of different secondary games upon a triggering event including an occurrence of a predetermined symbol or combination of symbols in a play of the primary game, wherein each secondary game is associated with a probability and each secondary game is associated with a different range of awards;

(c) randomly selecting one of the secondary games based on the probabilities associated with the secondary games;

(d) providing the selected secondary game to the player; and (e) awarding the player an award from the range of awards associated with the selected secondary game.

69. The method of claim 68, wherein the operation the gaming device is provided through a data network.

70. The method of claim 69 wherein the data network is an internet.

* * * * *